United States Patent [19]

Christen et al.

[11] Patent Number: 4,521,548
[45] Date of Patent: Jun. 4, 1985

[54] PREPARATION OF POLYETHER POLYOLS

[75] Inventors: Jimmie D. Christen, Lake Jackson; Henry B. Taylor, III, Angleton, both of Tex.

[73] Assignee: The Dow Chemical Company, Midland, Mich.

[21] Appl. No.: 484,132

[22] Filed: Apr. 12, 1983

[51] Int. Cl.$^3$ .............................................. C08G 18/14
[52] U.S. Cl. ..................................... 521/167; 521/176; 568/621
[58] Field of Search ................ 521/167, 176; 568/621

[56] References Cited

U.S. PATENT DOCUMENTS

| | | | |
|---|---|---|---|
| 2,934,505 | 4/1960 | Gurgiolo | 528/413 |
| 2,983,763 | 5/1961 | Krause | 568/621 |
| 3,000,963 | 9/1961 | Speramza | 568/621 |
| 3,016,404 | 1/1962 | Beauchamp et al. | 568/621 |
| 3,030,426 | 4/1962 | Moseley et al. | 568/621 |
| 3,299,151 | 1/1967 | Wismer et al. | 568/621 |
| 3,342,747 | 9/1976 | Mindick et al. | 252/313 S |
| 3,373,122 | 3/1968 | Porter et al. | 521/112 |
| 3,385,806 | 5/1968 | Critchfield et al. | 521/112 |
| 3,390,027 | 6/1968 | Olberg et al. | 149/19.4 |
| 3,395,108 | 7/1968 | Stanley et al. | 524/871 |
| 3,446,771 | 5/1969 | Matsubayashi et al. | 524/98 |
| 3,626,023 | 12/1971 | Brizgys | 427/383.1 |
| 3,793,240 | 2/1974 | Smith | 521/108 |
| 3,803,064 | 4/1974 | Fishbein et al. | 521/107 |
| 3,865,806 | 2/1975 | Knodel | 536/120 |
| 3,884,849 | 5/1975 | Molbert | 521/124 |
| 3,892,685 | 7/1975 | Pusey | 521/121 |
| 3,897,410 | 7/1975 | Olstowski et al. | 524/792 |
| 3,914,269 | 10/1975 | Nersasian | 260/453 PH |
| 3,919,174 | 11/1975 | Taller | 528/80 |
| 3,943,075 | 3/1976 | Fishbein et al. | 521/174 |
| 3,951,822 | 4/1976 | Brown et al. | 252/609 |
| 4,025,466 | 5/1977 | Jourquin et al. | 521/115 |
| 4,029,879 | 6/1977 | Muzzio | 536/4 |
| 4,066,580 | 1/1978 | Falkenstein et al. | 521/130 |
| 4,098,732 | 7/1978 | Yukuta et al. | 521/125 |
| 4,107,069 | 8/1978 | Keller et al. | 252/182 |
| 4,110,268 | 8/1978 | Longley et al. | 521/177 |
| 4,125,505 | 11/1978 | Critchfield et al. | 524/317 |
| 4,148,980 | 4/1979 | Narayan | 521/115 |
| 4,150,206 | 4/1979 | Jorquin et al. | 521/51 |
| 4,166,164 | 8/1979 | Cenker et al. | 521/125 |
| 4,191,815 | 3/1980 | Jourquin et al. | 521/51 |
| 4,200,699 | 4/1980 | Treadwell | 521/124 |
| 4,209,609 | 6/1980 | Hass | 528/421 |
| 4,223,098 | 9/1980 | Treadwell | 521/116 |
| 4,228,310 | 10/1980 | Speranza et al. | 568/620 |
| 4,256,841 | 3/1981 | Horacek et al. | 521/51 |
| 4,260,728 | 4/1981 | Turley et al. | 528/57 |
| 4,273,910 | 6/1981 | Lederer | 528/48 |
| 4,277,571 | 7/1981 | Falkenstein et al. | 521/164 |
| 4,282,330 | 8/1981 | Austin | 521/118 |
| 4,284,728 | 8/1981 | Demou et al. | 521/155 |
| 4,302,551 | 11/1981 | Horn et al. | 521/163 |

FOREIGN PATENT DOCUMENTS 1344038  1/1974  United Kingdom .

Primary Examiner—John Kight
Assistant Examiner—Marvin L. Moore
Attorney, Agent, or Firm—Paul D. Hayhurst

[57] ABSTRACT

In the production of polyether polyols, the neutralization of alkaline catalysts using formic acid such that no precipitate forms.

19 Claims, No Drawings

PREPARATION OF POLYETHER POLYOLS

BACKGROUND OF THE INVENTION

This invention relates to a process for producing polyether-containing compounds. More specifically, it pertains to a process of neutralizing alkaline catalysts used in the production of polyether polyols, and to polyols produced by said process.

Polyether polyols prepared from alkylene oxides have been utilized in lubricants, emulsifiers, plasticizers, solvents, and as intermediates in the preparation of polyurethane and polyurethane-modified polyisocyanurate foams.

The production of a polyether polyol from alkylene oxides is ordinarily carried out by the addition of the alkylene oxides to an initiator compound in the presence of an alkaline catalyst at temperatures of from about 70° C. to about 160° C. The alkaline catalyst is usually present in quantities of about 0.05 percent to about 1 percent by weight of the reactants. A typical production method involves the reaction of propylene oxide with propylene glycol in the presence of potassium hydroxide. The resulting crude polyol contains potassium hydroxide. The potassium hydroxide is typically removed so that the polyol will not react erratically with an isocyanate in polyurethane production.

Various methods have been utilized to reduce the level of residual alkaline materials in the final polyol product. Among these methods are included the neutralization of the alkaline materials with hydrochloric acid followed by separation of precipitated alkali metal salts and removal of excess acid. This method is described in U.S. Pat. No. 3,016,404. For some applications, the neutralization method employing hydrochloric acid was an improvement over neutralization methods employing sulfuric acid, phosphoric acid, carbon dioxide, and the like. The hydrochloric acid method is advantageous in that effective neutralization occurs rapidly and excess acid can be removed by gas stripping means. The hydrochloric acid method is disadvantageous in that hydrochloric acid is toxic and corrosive. This method has another important disadvantage. Since determination of the exact amount of acid necessary to neutralize the residual catalyst is extremely difficult, an excess of acid is conventionally used. Thus, excess acid must be readily removable from the polyether polyol, because if excess acid remains in the final polyol product, the presence of said acid may lead to undesirable consequences. For example, excess acid may tend to degrade the polyether chains and may adversely affect materials, such as surfactants and alkaline catalysts, which are typically added to the polyol in the preparation of polyol master batch formulations.

Another method for effectively neutralizing the residual alkaline materials and removal of same involves the use of solid organic acids. This method is described in U.S. Pat. No. 3,000,963. Solid organic acids such as oxalic, benzoic, citric, succinic, fumaric, phthalic, and the like were utilized to neutralize the residual alkaline materials in the crude polyether polyol. Excess acid and the precipitated alkali metal salt were subsequently removed by filtration. One of the requirements of the solid organic acid utilized in this method is that the organic acid, and the salt of the acid and the alkaline catalyst, be insoluble in the polyether polyol.

The use of an excess of formic acid to neutralize an alkali metal hydroxide catalyst in a crude lower alkylene oxide-polyhydroxy initiator adduct is described in U.S. Pat. No. 3,299,151. Said patent teaches the use of an amount of formic acid sufficient to precipitate substantially all of said catalyst, and requires the subsequent removal of the precipitate in order to obtain a polyol which would be suitable for use in the production of flexible polyurethane foams. The excess acid was removed by stripping means.

The use of oleic acid, either alone or in combination with certain sulfonic acids, to neutralize basic catalysts in polyols prepared using polyhydric alcohol initiators is described in U.S. Pat. No. 4,110,268. The resulting salt is not removed from the polyol, and the salt acts as a strong catalyst for the reaction in which the polyol is typically employed. A polyol having a high degree of inherent catalytic activity due to such a salt is undesirable for use in many applications. For example, intricate molds may be employed in the preparation of detailed parts from polyurethane and polyurethane-modified polyisocyanurate foams. The use of such molds makes it desirable to employ a polyol/polyisocyanate mixture which has a relatively long foam time so that the mold may be completely filled before the mixture sets up as a foam. Clearly, it would be undesirable to employ a polyol having a high degree of inherent catalytic activity in such an application.

In view of the disadvantages of the methods of the prior art, it would be desirable in the production of polyols to have an efficient and inexpensive method of neutralizing alkaline catalysts, which would not produce solid precipitates, which would not employ a toxic and corrosive neutralizing agent such as hydrochloric acid, and which would not produce a polyol having a high degree of inherent catalytic activity.

SUMMARY OF THE INVENTION

The present invention is such a method which combines many of the advantages of known neutralization methods and obviates at least one of the disadvantages associated with the method of the prior art. The invention is a process for the preparation of polyether-containing polyols which are useful in the production of polyurethane-containing polymers, such as, for example, polyurethane foams and polyurethane-modified polyisocyanurate foams. More specifically, the invention is a process for neutralizing an alkaline catalyst in a crude polyether-containing polyol by contacting said polyol with formic acid under reaction conditions such that the reaction products of the formic acid and the catalyst are soluble in the polyol.

In another aspect, the present invention is a polyether-containing polyol composition which includes:
(a) the reaction product of at least one initiator compound and at least one alkylene oxide; and
(b) the reaction product of formic acid and an alkaline catalyst used to prepare the reaction product of (a); said reaction product of (b) being soluble in the reaction product of (a).

Further, the invention relates to polyurethane-containing polymers, especially foams, prepared using a polyol prepared by the process of the present invention.

Surprisingly, it has been discovered that polyols neutralized using formic acid have a lower degree of autocatalytic activity than do polyols neutralized using oleic acid or other carboxylic acids having more than one carbon atom. Thus, an advantage of the process of the present invention is that polyols produced by this process may be used in making complex polyurethane-containing foam parts while leaving a foam maker maximum flexibility with respect to the choice and concentration of additional catalysts to be employed in the formations used to make said foam parts. Additional advantages of the present invention include considerable savings of time and money resulting from the omission of filtration or centrifugation steps, which may entail appreciable loss of polyol.

DETAILED DESCRIPTION OF THE INVENTION

The process of the present invention requires formic acid and a polyether-containing polyol which contains an alkaline catalyst.

The process of the present invention is generally applicable to polyether-containing polyols which are prepared using an alkaline catalyst. Methods for the preparation of the polyols are well-known and generally involve the reaction of at least one alkylene oxide with an active-hydrogen-containing initiator compound in the presence of an alkaline catalyst. Polyols suitable for use in the present invention include, for example, polyester polyols as well as linear and branched chain polyether polyols having aliphatic or aromatic-aliphatic character. The polyols may be prepared from known active-hydrogen-containing initiators used in the preparation of polyols such as amines and polyhydroxy compounds. The alkylene oxide is typically a vicinal alkylene oxide such as ethylene oxide, propylene oxide or butylene oxide. Alkylene oxides may be employed as mixtures.

Polyether polyols and methods for their preparation are, as previously stated, well-known, and illustrative references to said polyols and methods include U.S. Pat. No. 3,865,806, U.S. Pat. No. 4,125,505, U.S. Pat. No. 4,209,609, and the references cited therein. The teachings of these patents and references are incorporated herein by reference.

The key requirement of any polyol to be used in the process of the present invention is that the neutralized alkaline catalyst be soluble in the polyether polyol. For the purposes of the present invention, the term soluble means soluble to such an extent that no precipitate forms under the reaction or storage conditions normally applied to the specific polyol under consideration. Preferred polyols for use in the process of the present invention are those having a hydroxyl number of at least about 175. The most preferred polyols have a hydroxyl number of at least about 230.

As used herein, the hydroxyl number is determined by, and defined as, the number of milligrams of potassium hydroxide required for the complete neutralization of the hydrolysis product of the fully acylated derivative prepared from one gram of polyol or mixture of polyols. The hydroxyl number is a dimensionless quantity which is also defined by the following equation which reflects its relationship with the functionality and molecular weight of the polyol reactant:

$$OH = (56.1 \times 1000 \times f/MW)$$

wherein
OH = hydroxyl number of the polyol;
f = average functionality, that is, average number of hydroxyl groups per molecule of polyol; and
MW = average molecular weight of the polyol.

The hydroxyl number is further defined by the following equation:

$$OH = 56,100/EW$$

wherein EW is the average equivalent weight of the polyol, and wherein OH is as defined hereinbefore.

Alkaline catalysts which may be used for the preparation of polyether polyols are well-known, and illustrative references to said catalysts include U.S. Pat. No. 4,209,609, U.S. Pat. No. 4,110,268, and the references cited therein. The teachings of these patents are incorporated herein by reference. Any alkaline catalyst known in the art may be neutralized using the process of the present invention. Preferably, the alkaline catalyst which is to be neutralized is a metal-containing alkaline catalyst. More preferred catalysts are those metal-containing alkaline catalysts in which the metal is an alkali metal, and of these, the alkali metal hydroxides are preferred. Examples of more preferred catalysts include those containing an alkali metal hydroxide or an alkaline earth metal hydroxide. Potassium hydroxide is the most preferred catalyst.

The formic acid may be employed in any form which neutralizes the alkaline catalyst, such as liquid anhydrous formic acid, aqueous formic acid, or gaseous formic acid. It is preferred to use aqueous formic acid. The formic acid is employed in an amount which is sufficient to neutralize the alkaline catalyst. Typically, at least about 1 equivalent of formic acid per equivalent of alkaline catalyst is employed, with the use of about 1 to about 1.1 equivalents being common. Preferably, 1 equivalent of formic acid is employed.

The neutralization of the alkaline catalyst may be accomplished by adding the formic acid to the polyol at or near the end of the alkoxylation step in a manner such that the formic acid is distributed evenly throughout the polyol. Typically, even distribution of the acid is accomplished by methods such as, for example, stirring or inert gas bubbling. Preferably, the formic acid is added to the polyol when the concentration of unreacted alkylene oxide in the reaction mixture is 100 ppm or less. The time required to complete the neutralization is a function of the mass of the polyol to be neutralized, the rate of addition of formic acid, the rate and type of mixing, the temperature, and the like.

The temperature and pressure employed during the neutralization step is not critical so long as the amount of formic acid employed is sufficient to completely neutralize the alkaline catalyst in the polyol. For example, when liquid formic acid is employed, the combination of temperature and pressure is such that the acid does not vaporize to such a degree that the alkaline catalyst is not completely neutralized. Typically, the temperature of the polyol is between about 20° and about 150° C. Preferably, the temperature is between about 50° C. and 100° C. Below 20° C. the neutralization will proceed slowly, if at all. Above 150° C. polymer degradation may occur.

When the neutralization is complete, the reaction mass is stripped to remove therefrom any remaining volatiles, such as $H_2O$, formic acid or unreacted alkylene oxides.

In the finished form, the polyol may be suitably reacted with a polyisocyanate to prepare a polyurethane-containing polymer. The various methods for the preparation of polyurethane-containing polymers, such as ppolyurethane foams and polyurethane-modified polyisocyanurate foams, are well-known. For a reference to said methods and to various catalysts, blowing agents, other additives, and polyisocyanates, see U.S. Pat. No. 4,209,609 and the references cited therein; said references and the teachings of U.S. Pat. No. 4,209,609 are hereby incorporated herein by reference. For a reference to catalysts suitable for promoting isocyanurate group formation and the use of said catalysts, see U.S. Pat. No. 4,302,551, the teachings of which, with respect to said catalysts and their use, are incorporated herein by reference.

SPECIFIC EMBODIMENTS

The following examples are given to illustrate the invention, but these examples should not be construed as limiting its scope. All parts and percentages are by weight unless otherwise indicated.

EXAMPLE 1

Toluene diamine (228 g, 1.87 moles) is melted and is added to a reaction vessel having a temperature recording and control means, a means for stirring, a pressure recording and control means and a means for purging with inert gas. Then, 2.5 g of an aqueous 50 percent by weight solution of KOH is added to the vessel. Ethylene oxide (423 g, 9.61 moles) is added to a closed storage vessel, then propylene oxide (577 g, 9.95 moles) is added to the closed storage vessel, which is at room temperature. The ethylene oxide and propylene oxide are then thoroughly mixed. The reaction vessel is heated to 120° C.–125° C. and the mixture of vicinal alkylene oxides is slowly introduced into the reaction vessel over a period of approximately 7 hours. The mixture in the reaction vessel is then allowed to digest, or react, until it is observed that the pressure in the reaction vessel decreases until it stabilizes at from 5 to 15 psig. The pH of the resulting polyol, Polyol A, is 10.5.

The reaction vessel is cooled to 90° C., and an aqueous solution (1.2 g of 89.4 percent formic acid) is added to the reaction vessel in order to neutralize the residual KOH in the 1208 g of crude polyol. The contents of the reactor are stirred for approximately 2 hours at 90° C. Then, the reaction vessel is subjected to subatmospheric pressure to remove any remaining volatile materials, such as water or unreacted alkylene oxide(s) or formic acid, to give a finished polyol product having a pH of 9.2.

COMPARATIVE EXPERIMENT 1

This is not an embodiment of the present invention.

The procedure of Example 1 is repeated with the following exceptions: 3 g of glacial acetic acid are added to 1377.8 g of a crude polyol. The pH of the finished polyol is 9.1.

COMPARATIVE EXPERIMENT 2

This is not an embodiment of the present invention.

The procedure of Example 1 is repeated with the following exceptions: 7.1 g of food grade oleic acid are added to 1411.7 g of crude polyol. The pH of the finished polyol is 9.3.

For each finished polyol, i.e., the polyol of Example 1, the polyol of Comparative Experiment 1 and the polyol of Comparative Experiment 2, the residual acidity of the polyol is not detectable by titration, and the residual alkalinity of the polyol is very low, as determined by titration.

EXAMPLE 2

A polyurethane-containing foam is prepared using the following formulation of components:

A. 35 g polyol of Example 1;
B. 1 g DC 193[1];
C. 20 g R-11[2]; and
D. 65 g Polymeric MDI[3].

[1]DC 193 is a commercial silicone surfactant available from Dow Corning Corporation.
[2]R-11 is a CCl$_3$F-type blowing agent which optionally includes a free radical scavenger.
[3]The polymeric methylene diphenylene diisocyanate employed is a multifunctional polyisocyanate having an isocyanate functionality of about 2.7. Polymeric methylene diphenylene diisocyanate is commercially available from several sources including e.g., Rubicon Chemicals, Inc. under the brand name RUBINATE M.

Components A, B and C are premixed, then the premix is blended with Component D for approximately 10 seconds in an open cup using a high speed air driven mixer. Some reactivity data for the resulting foam are given in Table I.

COMPARATIVE EXPERIMENTS 3–4

These are not embodiments of the present invention.

Foams are prepared using the formulation and method of Example 2, except that the polyols are those of Comparative Experiments 1 and 2, respectively. Some reactivity data for the foams are given in Table I.

TABLE I

| FOAMS PREPARED USING POLYOLS INITIATED FROM AMINES | | | |
|---|---|---|---|
| | Ex. 2 | C.E. 3 | C.E. 4 |
| Catalyst-neutralizing Acid | formic | acetic | oleic |
| Reaction Profile (in seconds) | | | |
| Cream time | 88 | 65 | 41 |
| Gel time | 280 | 210 | 175 |
| Tack-free time | 580 | 520 | 480 |
| Foam time | 345 | 335 | 220 |

Interestingly, the results summarized in Table I indicate that neutralization of amine-initiated polyols using formic acid provides a polyol with a lower level of inherent catalytic activity than does neutralization using higher molecular weight organic acids which may also leave soluble reaction products in a polyol.

EXAMPLE 3

Glycerine (7.5 pounds) is added to a reaction vessel similar to that of Example 1. Then, 80 g of an aqueous 50 percent by weight solution of KOH is added to the vessel. The resulting mixture is heated to 110° C. under reduced pressure until the mixture contains less than 0.1 percent water. The mixture is then cooled to ambient temperature. Sucrose (13 pounds) is then added to the reaction vessel. The resulting mixture is then heated to 110° C. Then, 60 pounds of propylene oxide is added to the reaction vessel over a period of approximately 12 hours. The contents of the reaction vessel are then allowed to digest for approximately 4 hours. The vessel is cooled to 90° C., then 100 g of an aqueous solution of formic acid (90 percent acid) is added to the vessel and the contents are stirred for approximately 2 hours at 90° C. The vessel is then heated to 110° C. under reduced pressure until the contents contain less than 0.05 percent water. The pH of the product is 6.5. The hydroxyl number of the polyol is 393.

COMPARATIVE EXPERIMENT 5

This is not an embodiment of the present invention.

The procedure of Example 3 is repeated with the following exceptions: glacial acetic acid (115 g) is employed as the neutralizing acid. The pH of the finished polyol is 7.3.

EXAMPLE 4

The method of Example 2 is repeated except that the following formulation is employed:
A. 50 g polyol of Example 3;
B. 0.75 g DC 193;
C. 15 g R-11; and
D. 50 g polymeric MDI.
Some reactivity data are shown in Table II.

COMPARATIVE EXPERIMENT 6

This is not an embodiment of the present invention.

A foam is prepared using the formulation of Example 4, except that the polyol is that of Comparative Experiment 5. Some reactivity data are shown in Table II.

TABLE II
FOAMS USING POLYOLS INITIATED FROM HYDROXYL-CONTAINING COMPOUNDS

|  | Ex. 4 | C.E. 6 |
|---|---|---|
| Catalyst-neutralizing Acid | formic | acetic |
| Reaction Profile (in seconds) | | |
| Cream time | 275 | 215 |
| Gel time | 350 | 310 |
| Tack-free time | 500 | 475 |
| Foam time | 510 | 465 |

The results summarized in Table II indicate that neutralization of hydroxyl-initiated polyols using formic acid gives a finished polyol having a lower level of inherent catalytic activity than does neutralization using higher molecular weight organic acids.

GENERAL PROCEDURE FOR DETERMINATION OF PRECIPITATE FORMATION

Polyols are prepared according to the method of Example 3 except that the mass of KOH, the mass of formic acid, and the mass of propylene oxide are varied. Then, some of the finished polyols are further treated with additional formic acid. The polyols are observed visually in order to determine the presence of any precipitated material. The results of several runs are summarized in Table III.

The "observed pH" in Table III is the pH at which the polyol is observed to determine whether there is precipitation. The pH is measured using the following procedure. Place 60 ml of a 10:1 by weight methanol:-water solution in a 100-ml beaker. Add to the beaker 10 g of the polyol to be tested. Mix until a complete solution is formed. Determine the pH at 25° C. using glass combination electrodes and a prestandardized pH meter such as, for example, a Leeds and Northrup Model 7401 with electrodes No. 1199-30 and No. 1199-31. The hydroxyl number of each polyol is determined according to ASTM D-2849-69.

TABLE III

| Run # | Approx. Polyol Hydroxyl No. | Formate Concentration (ppm) | Precipitation | Observed pH |
|---|---|---|---|---|
| 1* | 57 | 6000 | yes | 4.4 |
| 2* | 57 | 1000 | yes | 4.3 |
| 3* | 92 | 6000 | yes | 8.4 |
| 4* | 92 | 1000 | yes | 8.1 |
| 5* | 144 | 6000 | yes | 8.6 |
| 6* | 144 | 1000 | very slight | 8.3 |
| 7* | 174 | 6000 | yes | 8.8 |
| 8 | 174 | 1000 | no | 8.2 |
| 9 | 174 | 1000 | no | 3.8 |
| 10* | 202 | 6000 | yes | 8.7 |
| 11 | 202 | 1000 | no | 8.2 |
| 12 | 202 | 1000 | no | 3.7 |
| 13 | 232 | 6000 | no | 4.6 |
| 14 | 232 | 6000 | no | 3.8 |
| 15 | 232 | 1000 | no | 4.5 |
| 16 | 232 | 1000 | no | 3.8 |
| 17 | 383 | 6000 | no | 3.9 |
| 18 | 383 | 1000 | no | 3.8 |
| 19 | 667 | 6000 | no | 3.8 |
| 20 | 667 | 1000 | no | 3.7 |

*Not an embodiment of the present invention.

The data of Table III indicate that precipitation is influenced by the hydroxyl number of the polyol and the concentration of formate. Additionally, other factors may affect the formation of a precipitate. An example of such a factor is the cation of the formate salt. In any case, the process of the present invention applies to polyether-containing polyols under conditions such that the reaction products of the formic acid and the catalyst are soluble in the polyol.

As mentioned previously, the preceding examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A process for neutralizing an alkaline catalyst in a crude polyether-containing polyol comprising contacting a polyol having a hydroxyl number of at least about 175 with formic acid under reaction conditions such that the reaction products of the formic acid and the catalyst are soluble in the polyol.

2. The process of claim 1 wherein the catalyst is a metal-containing alkaline catalyst.

3. The process of claim 2 wherein the metal is an alkali metal or an alkaline earth metal.

4. The process of claim 3 wherein the alkaline catalyst is an alkali metal hydroxide.

5. The process of claim 4 wherein the alkaline catalyst is potassium hydroxide.

6. The process of claim 1 wherein the formic acid is employed as aqueous formic acid.

7. The process of claim 1 wherein the polyol has at least one alkylene oxide chain having a random distribution of units of ethylene oxide and units of at least one higher molecular weight alkylene oxide.

8. The process of claim 7 wherein the random chain is formed using ethylene oxide and propylene oxide.

9. The process of claim 8 wherein the initiator comprises at least one aromatic amine.

10. The process of claim 9 wherein the initiator comprises toluene diamine.

11. The process of claim 9 wherein the initiator comprises methylene dianiline.

12. The process of claim 1 further comprising removing water and unreacted formic acid.

13. The process of claim 12 wherein the removal is by stripping means.

14. The process of claim 13 wherein the stripping is carried out utilizing an inert gas stream.

15. A polyurethane-containing polymer prepared using at least one polyol prepared using the process of claim 1.

16. A polyether-containing composition comprising:
 (a) the reaction product of at least one initiator compound and at least one alkylene oxide, the product having a hydroxyl number of at least about 175; and
 (b) the reaction product of formic acid and a metal-containing alkaline catalyst used to prepare the reaction product of (a); said reaction product of (b) being soluble in the reaction product of (a).

17. A composition of claim 16 having a hydroxyl number of at least about 230.

18. A polyurethane-containing polymer prepared using at least one polyether-containing composition of claim 16.

19. A process for the preparation of polyether-containing polyols comprising:
 (a) contacting at least one initiator compound with at least one alkylene oxide in the presence of an alkaline catalyst under reaction conditions such that a crude polyether-containing polyol is formed; and
 (b) contacting the crude polyol with an amount of formic acid which is sufficient to neutralize the alkaline catalyst under reaction conditions such that the reaction products of the formic acid and the catalyst are soluble in the polyol.

* * * * *